(12) United States Patent
Grossman et al.

(10) Patent No.: US 8,511,010 B2
(45) Date of Patent: Aug. 20, 2013

(54) INTEGRAL CATWALK SUPPORT

(75) Inventors: Rodney B. Grossman, Goshen, IN (US); Mark S. Dingeldein, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 13/569,889

(22) Filed: Aug. 8, 2012

(65) Prior Publication Data

US 2012/0304561 A1 Dec. 6, 2012

Related U.S. Application Data

(62) Division of application No. 12/533,627, filed on Jul. 31, 2009, now Pat. No. 8,286,394.

(51) Int. Cl.
*E04H 7/00* (2006.01)

(52) U.S. Cl.
USPC .............................. 52/194; 52/246; 52/650.3

(58) Field of Classification Search
USPC ........ 52/194, 246, 247, 653.1, 650.3, 651.01, 52/651.1, 848, 745.01, 698, 741.1
See application file for complete search history.

(56) References Cited

U.S. PATENT DOCUMENTS

| | | | |
|---|---|---|---|
| 1,519,292 A | 12/1924 | Castleman | |
| 2,838,805 A | 6/1958 | Shepherd | |
| 3,038,566 A | 6/1962 | Parsons | |
| 3,248,024 A | 4/1966 | Keathly | |
| 3,606,418 A | 9/1971 | Buker et al. | |
| 3,755,918 A * | 9/1973 | Parrot | 34/236 |
| 3,849,901 A * | 11/1974 | Sietmann et al. | 34/526 |
| 4,020,565 A | 5/1977 | Steffen | |
| 4,035,928 A * | 7/1977 | Sietmann et al. | 34/174 |
| 4,153,138 A | 5/1979 | Walberg | |
| 4,192,107 A | 3/1980 | Wickstrom et al. | |
| 4,206,839 A | 6/1980 | Young | |
| 4,218,859 A | 8/1980 | Sams | |
| 4,240,772 A | 12/1980 | Wyatt | |
| 4,480,534 A | 11/1984 | Sloan | |
| 4,523,417 A | 6/1985 | Beastall et al. | |
| 4,587,893 A * | 5/1986 | Brockhaus et al. | 454/182 |
| 4,589,332 A * | 5/1986 | Brockhaus et al. | 454/182 |
| 4,643,292 A | 2/1987 | Whited | |
| 4,709,519 A | 12/1987 | Liefer et al. | |
| 4,867,046 A | 9/1989 | Yoder | |
| 4,875,820 A | 10/1989 | Lepp et al. | |
| RE33,358 E | 10/1990 | Sukup | |
| 5,039,273 A | 8/1991 | Schuhmacher | |
| 5,107,644 A | 4/1992 | Hanig et al. | |
| 5,209,608 A | 5/1993 | Edwards | |
| 5,306,057 A | 4/1994 | Miller, Jr. | |
| 5,344,363 A | 9/1994 | Pollock | |

(Continued)

*Primary Examiner* — William Gilbert
*Assistant Examiner* — James Ference
(74) *Attorney, Agent, or Firm* — Harness, Dickey

(57) ABSTRACT

A structural support system for a bin structure. The structural support system comprises at least two parallel and spaced apart support columns. Each column has a plurality of inner column sections adjacent to the bin structure and a plurality of outer column sections coupled to the inner column sections. The inner and outer column sections form a closed shape support column configured for transferring vertical loads from an upper area of the bin structure to the foundation. An auxiliary device such as a catwalk or conveyor system may be attached to the top of the support columns. An anchor member may be provided, configured to allow limited movement of the auxiliary structure in relation to the support structure. Associated methods for strengthening the structural support of a bin structure are also provided.

19 Claims, 17 Drawing Sheets

(56) References Cited

U.S. PATENT DOCUMENTS

| | | |
|---|---|---|
| 5,496,215 A | 3/1996 | Underwood et al. |
| 5,538,388 A | 7/1996 | Bergkamp et al. |
| 5,564,235 A | 10/1996 | Butler |
| 5,570,547 A | 11/1996 | Webb et al. |
| 5,586,678 A | 12/1996 | Rosch et al. |
| 5,632,674 A | 5/1997 | Miller, Jr. |
| 6,017,180 A | 1/2000 | Wilham |
| 6,167,601 B1 | 1/2001 | Gollhofer et al. |
| 6,206,073 B1 | 3/2001 | Lay |
| 6,223,494 B1 | 5/2001 | Bright |
| 6,233,911 B1 | 5/2001 | Dillon |
| 6,299,137 B1 | 10/2001 | Bainter |
| 6,311,952 B2 | 11/2001 | Bainter |
| 6,358,142 B1 | 3/2002 | Imel et al. |
| 6,360,878 B1 | 3/2002 | Deal et al. |
| 6,405,855 B1 | 6/2002 | Peltier et al. |
| 6,485,365 B2 | 11/2002 | Imel et al. |
| 6,497,545 B1 | 12/2002 | Simrose |
| 6,499,266 B1 | 12/2002 | Macumber |
| 6,499,930 B1 | 12/2002 | Dixon |
| 6,561,736 B1 | 5/2003 | Doleshal |
| 6,606,844 B2 | 8/2003 | Dillon et al. |
| 6,608,491 B2 | 8/2003 | Salmon, Jr. |
| 6,632,135 B2 | 10/2003 | Matousek et al. |
| 6,641,115 B1 | 11/2003 | Bainter |
| 6,851,847 B2 | 2/2005 | Sukup |
| 6,941,712 B2 | 9/2005 | Sukup et al. |
| 6,966,740 B2 | 11/2005 | Mast et al. |
| 7,004,305 B2 | 2/2006 | Schaefer |
| 7,024,825 B2 | 4/2006 | Kebeli |
| 7,025,555 B2 | 4/2006 | Hanig |
| 7,063,497 B2 | 6/2006 | Mast et al. |
| 7,074,001 B2 | 7/2006 | Kinzer |
| 7,090,066 B2 | 8/2006 | Kirsch |
| 7,125,215 B2 | 10/2006 | Kinzer |
| 7,155,874 B2 * | 1/2007 | Lee ............................... 52/843 |
| 7,198,449 B2 | 4/2007 | Dillon |
| 7,240,029 B2 | 7/2007 | Kallestad |
| 7,243,857 B2 | 7/2007 | Kallestad |
| 7,310,919 B2 | 12/2007 | Grossman et al. |
| 7,381,131 B1 | 6/2008 | Harpole |
| 7,392,624 B2 | 7/2008 | Kinzer |
| 7,393,275 B2 | 7/2008 | Voss et al. |
| 7,472,070 B2 | 12/2008 | Kallestad |
| 7,487,621 B2 | 2/2009 | Grossman et al. |
| 7,905,069 B1 | 3/2011 | Lockwood |
| 2006/0283132 A1 | 12/2006 | Bankston et al. |
| 2008/0209848 A1 | 9/2008 | Kinzer |

\* cited by examiner

INTEGRAL CATWALK SUPPORT

CROSS-REFERENCE TO RELATED APPLICATIONS

This application is a divisional of U.S. patent application Ser. No. 12/533,627 filed on Jul. 31, 2009. The entire disclosure of the above application is incorporated herein by reference.

FIELD

The present disclosure relates to bin structures, and more particularly, to an integral structural support system for a catwalk or other auxiliary structure.

BACKGROUND

This section provides background information related to the present disclosure which is not necessarily prior art.

Conventional support structures for the placement of a catwalk, conveyor and other auxiliary structures above farm bin structures are known in the art. Typically, such catwalks are supported by independent towers formed of two legs cross-braced together that extend down to the ground. The towers can be attached to the sides of a grain bin via brackets to the body sheet or to vertical stiffeners. Alternatively or additionally, independent towers formed of two legs cross-braced together extending only partially to the ground can be provided. Vertical loads are commonly transferred directly from the catwalk to such catwalk towers but may generate unwanted forces within the bin structure. Conventional catwalk supports and towers are separate from the standard grain bin structure and can have complicated installation processes requiring an extensive amount of installation time and labor. In addition, such separate towers can interfere with other surrounding bins or equipment. Typically, they can only be installed after the entire bin structure is assembled. Having separate, long, and heavy columns to ensure a sturdy independent tower increases both production and shipping costs.

While conventional towers and bin structures may be somewhat suitable for their intended use, they are subject to improvement. For example, there is a need for enhanced supports and structures that require little assembly, strengthened and more durable construction, and/or an overall design that permits the use as an add-on feature to preexisting and current bin shipments and that can be provided in a space saving manner during shipment.

SUMMARY

This section provides a general summary of the disclosure, and is not a comprehensive disclosure of its full scope or all of its features.

The present disclosure provides an integral structural support system for a bin structure. In various aspects, the structural support system includes at least two parallel and spaced apart support columns. Each column has a plurality of inner column sections coupled to adjacent wall panels of the bin structure and a plurality of outer column sections coupled to the inner column sections. The outer column sections are coupled to the inner column sections forming a closed shape support column configured for transferring loads from an upper portion of the bin structure to a foundation of the bin structure. Inner columns are coupled to each other at a plurality of inner joints; outer columns are coupled to each other at a plurality of outer joints. In certain aspects, a plurality of inner vertical splices and a plurality of outer vertical splices are provided. Adjacent inner column sections are coupled to one another via an inner vertical splice to reinforce the inner joints. Likewise, adjacent outer column sections are coupled to one another via an outer vertical splice to reinforce the outer joints. The inner joints, or joint areas, may be spaced apart in a vertical direction from the outer joints, or joint areas.

The present disclosure also relates to a method for supporting an auxiliary structure above a bin structure. The method includes aligning a plurality of supplemental vertical support stiffeners with a plurality of standard vertical stiffeners of a bin structure. Once aligned, the supplemental vertical support stiffeners are mechanically fastened to the standard vertical stiffeners. A continuous and closed shape support column is formed and an auxiliary structure may be coupled to an upper end thereto. The support column is integral with the bin structure and configured for transferring vertical loads from the upper end of the support column to a foundation of the bin structure.

An anchoring support system for mounting an auxiliary structure above a bin structure is also disclosed. The anchoring support system includes a load bearing support structure coupled to a side of the bin structure and at least one anchor bracket coupled thereto. The anchor bracket is configured to be coupled to the auxiliary structure and to allow limited pivoting movement of the auxiliary structure in relation to the support structure. In certain aspects, the anchor bracket includes a base and at least one upstanding connection portion fixed to the base. The upstanding connection portion defines an extending slot aperture configured to allow the limited movement of the auxiliary structure.

The present disclosure additionally relates to a method for relieving a load at the interface between a bin structure and an auxiliary structure disposed above the bin structure. The method includes forming a closed shape support column configured for transferring vertical loads from an upper portion of the bin structure to a foundation of the bin structure. An anchor bracket is attached to a top end of the support column. The auxiliary structure is fastened to the anchor bracket. The anchor bracket is configured to allow limited pivoting movement of the auxiliary structure in relation to the support column.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
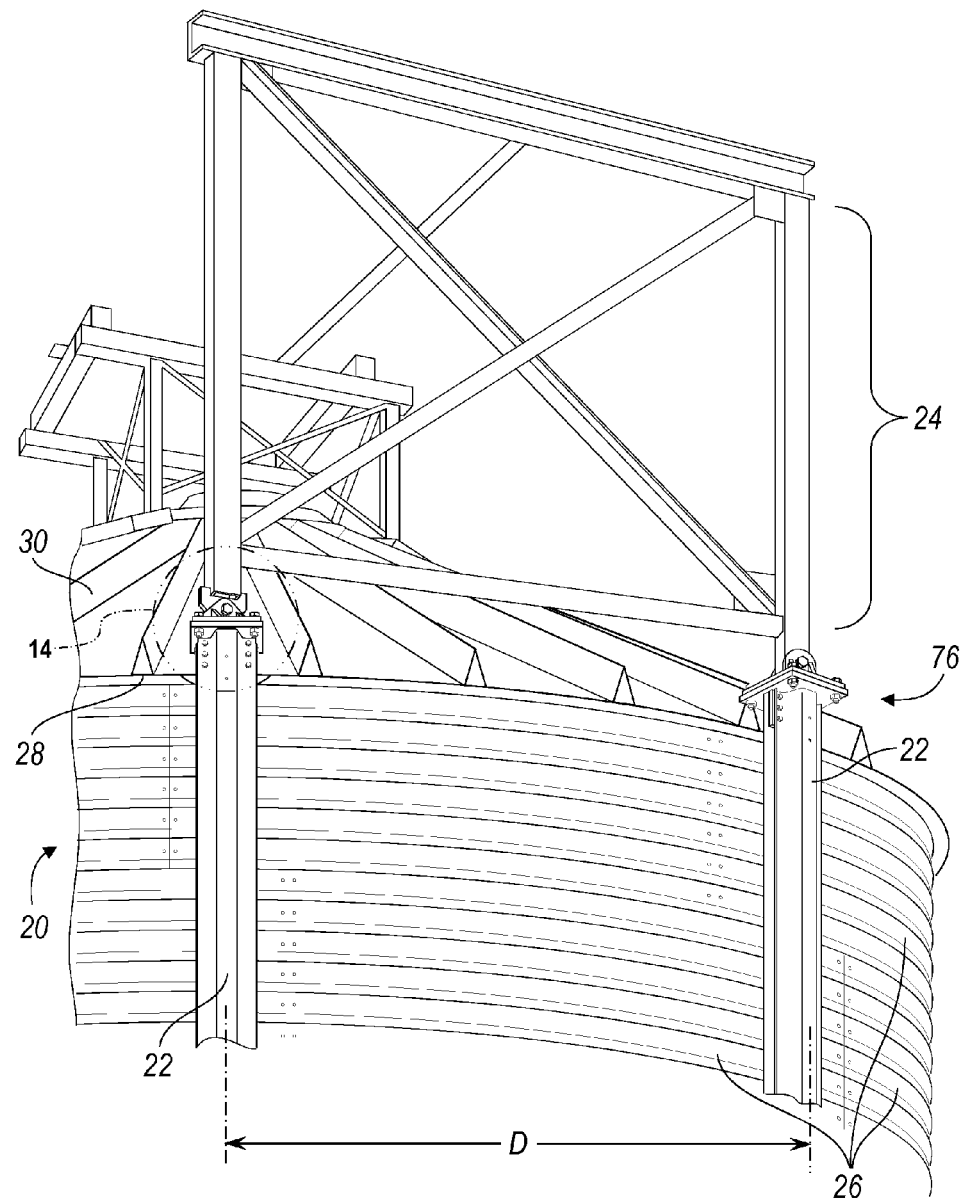
FIG. 1 illustrates a perspective view of a bin structure including a pair of support columns supporting an auxiliary structure according to the present disclosure.

Example embodiments will now be described more fully with reference to the accompanying drawings.

Specific details are set forth such as exemplary specific components, devices, and methods, to provide a thorough understanding of embodiments of the present disclosure. It will be apparent to those skilled in the art that various specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "connected to" or "coupled to" another element or layer, it may be directly connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a bin structure having an integral support system for use with an auxiliary structure, such as a catwalk system, conveyor system, or other structure (excluding a common roof) that may generally be constructed above a bin structure. Although this document may specifically refer to catwalk structures or catwalk systems, this is not meant to be limiting and other types of auxiliary structures may be supported above bins using the teachings herein. The integral support system may be used with both new and pre-existing bin structures. As used herein, a "bin structure" is meant to include any large container for storing something in bulk, such as grain, typically found on farms and used in commercial agricultural applications, and includes sidewalls and a roof. FIG. 1 illustrates a perspective view of an exemplary bin structure, generally indicated by the reference number 20, further including a pair of support columns 22 supporting an auxiliary structure 24 according to the present disclosure. As shown, the auxiliary structure 24 is a catwalk support. The bin 20 may be of a typical cylindrical shape made up of a plurality of body sheets 26 that are mechanically fastened to one another in ring sections as is known in the art. In various embodiments, and as shown, the support columns 22 of the present disclosure serve as load bearing support structures, wherein any applied load is transferred directly to the ground. They may be separated by a length, or radial distance (D), equivalent to that of the width of a body sheet 26.

The support column 22 components may be added to a compatible, existing bin structure or the components may be shipped and constructed simultaneously with a standard new bin construction. Support column components can be attached to standard pre-existing vertical bin stiffeners extending from the eave 28 of the bin to the foundation area 32, as will be discussed below. The portion above the eave 28 of the structure 20 may be built first, when the bin roof 30 is constructed. The portions below the eave 28 are subsequently attached to the bin wall in sections as the rings of the bin are added and the structure is elevated, typically one ring level at a time. The vertical load capacity of such a design is typically equivalent to the bin peak load capacity for each diameter. As will be discussed below, no modifications to the bin foundation area 32 are required. The sidewall components may be corrugated and may vary based on the desired eave height, while the roof components may vary based on the desired diameter of the bin structure.

Figure 2:
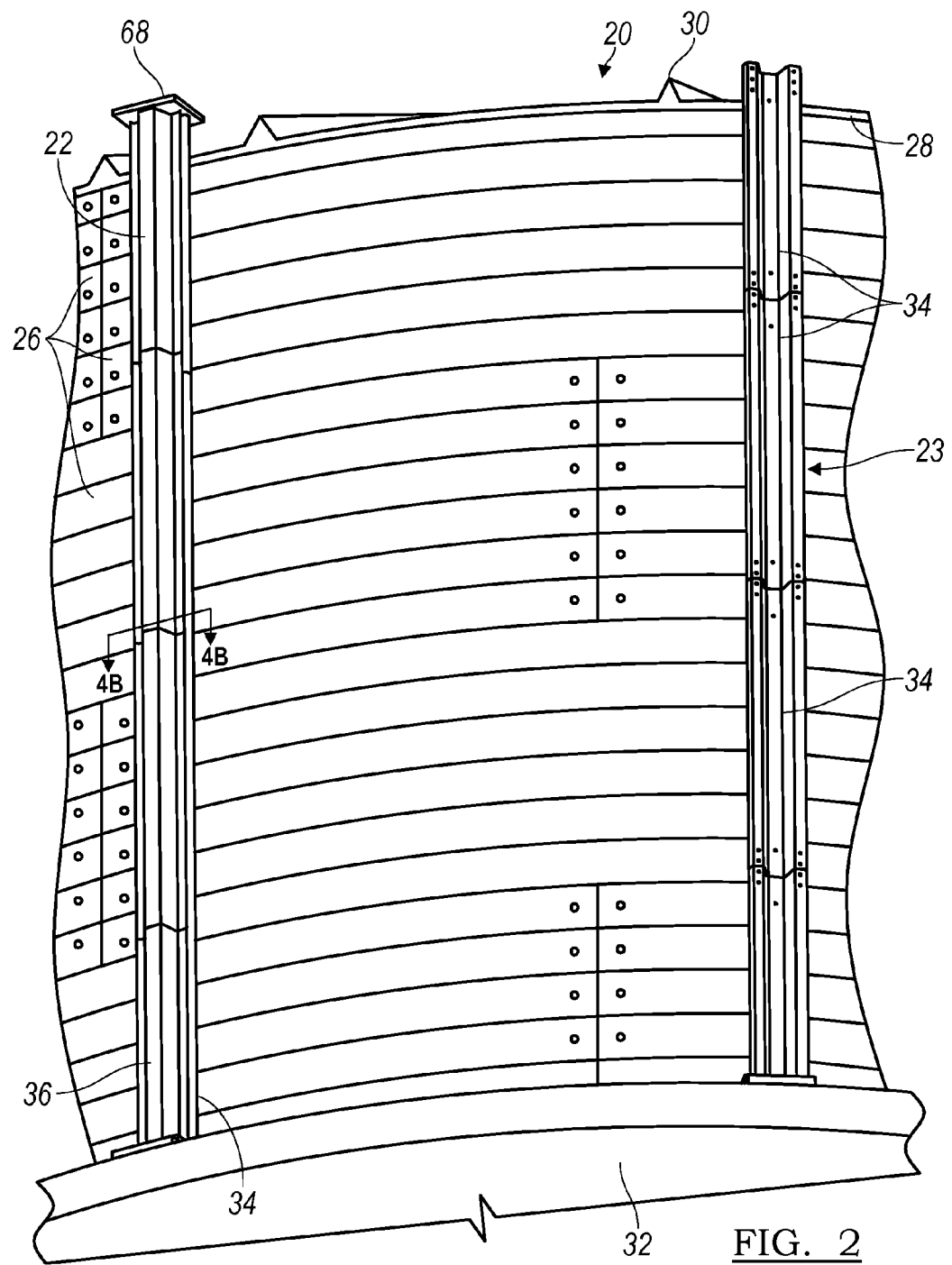
FIG. 2 is a perspective view of a bin structure illustrating one support column according to the present disclosure.
Figure 3:
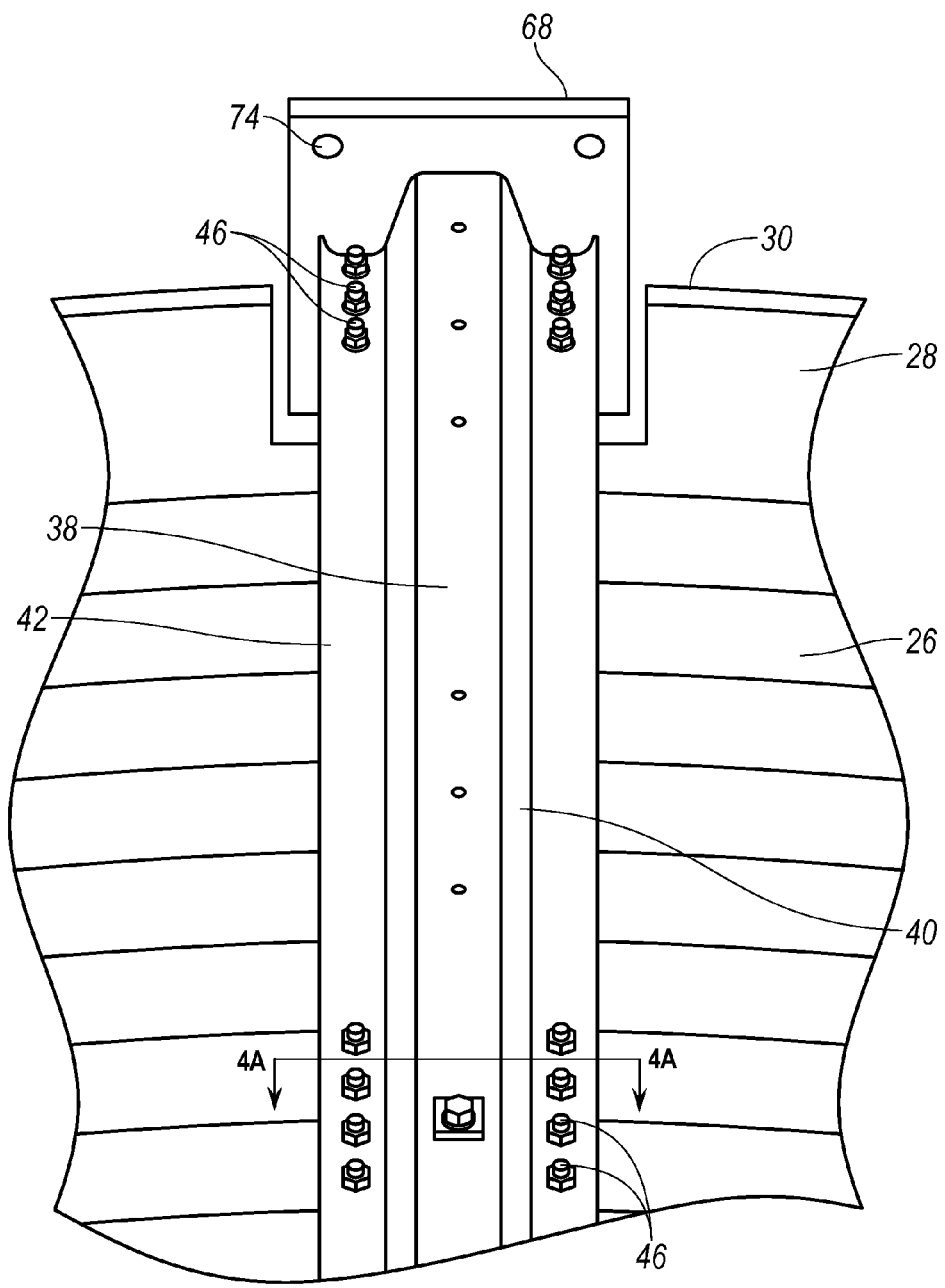
FIG. 3 is a partial magnified view of the support column of FIG. 3.

FIG. 2 is a perspective view of a bin structure illustrating one assembled support column 22 according to the present disclosure and one standard bin stiffener 23. The standard bin stiffener 23 is similar in shape and design as the plurality of inner column sections 34, discussed below. FIG. 3 is a partial magnified view of the assembled support column of FIG. 3. The support column 22 extends from an upper portion of the bin structure 20, near the eave 28, and continues to a foundation area 32 of the bin structure 20. The support columns 22 are designed to transfer applied vertical loads from catwalk structures 24 to the foundation 32.

Figure 4A:
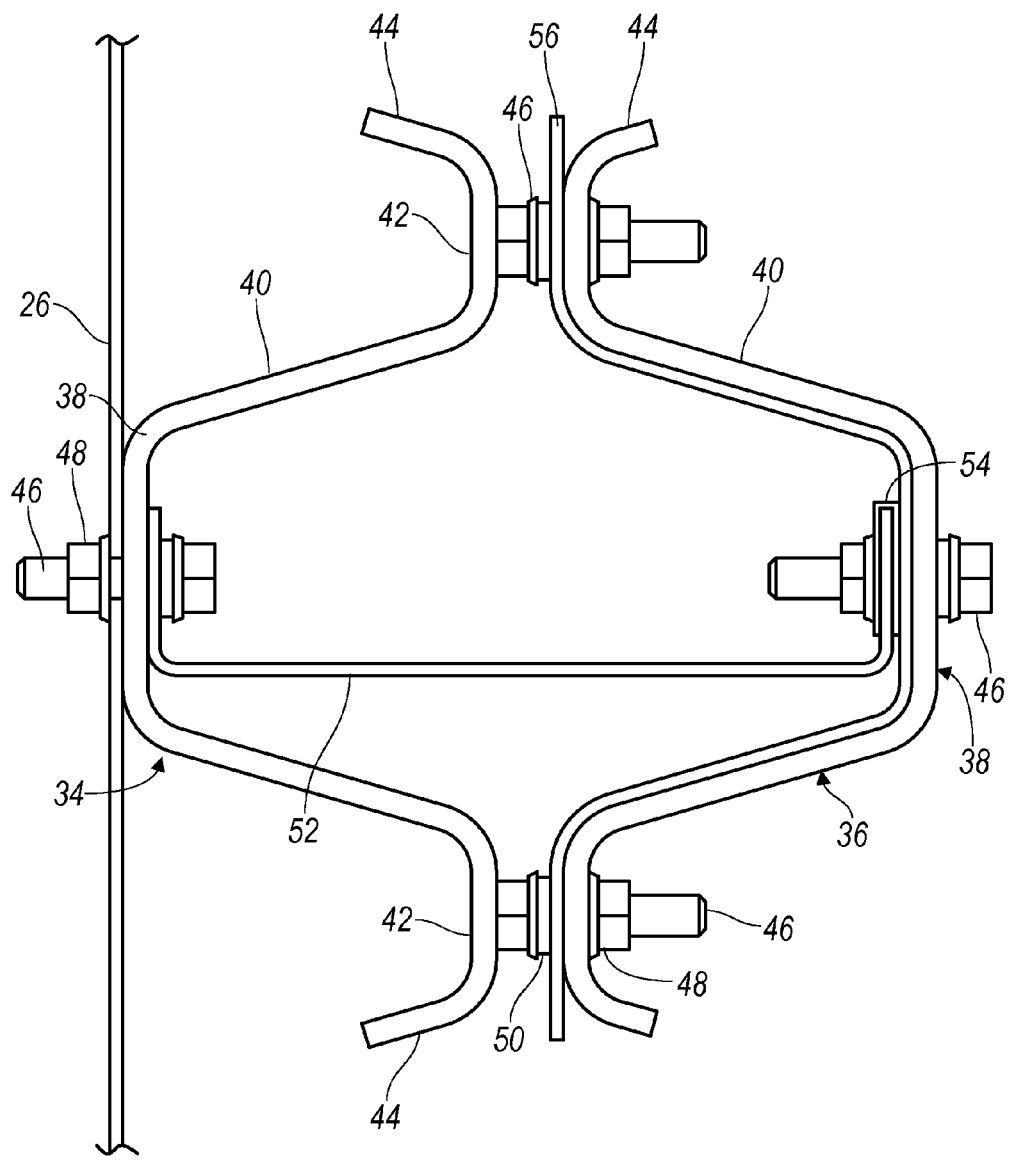
FIG. 4a is a cross-sectional view of the support column taken along the line 4a-4a of FIGS. 2 and 3.
Figure 4B:
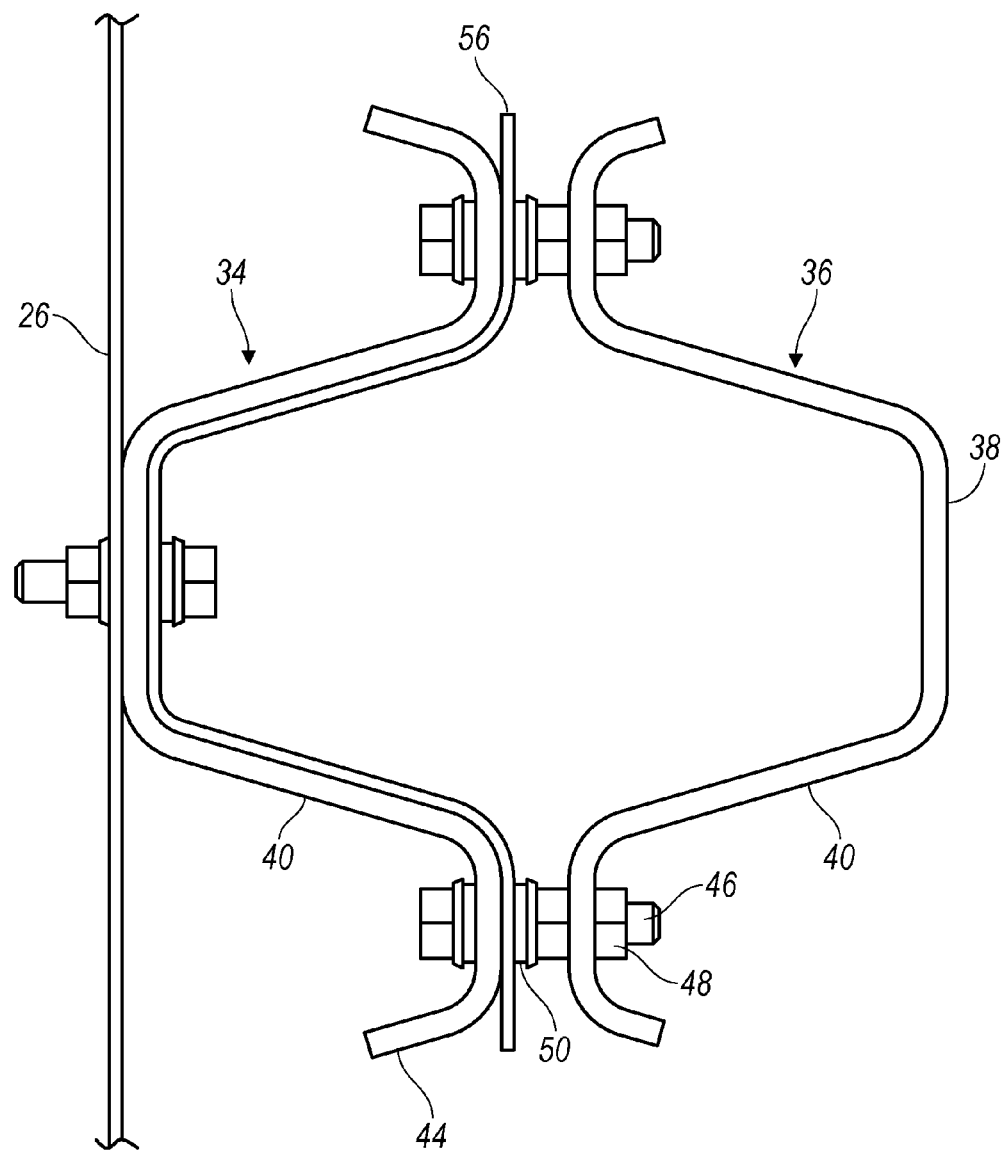
FIG. 4b is a cross-sectional view of a support column taken along the line 4b-4b of FIG. 2.
Figure 5:
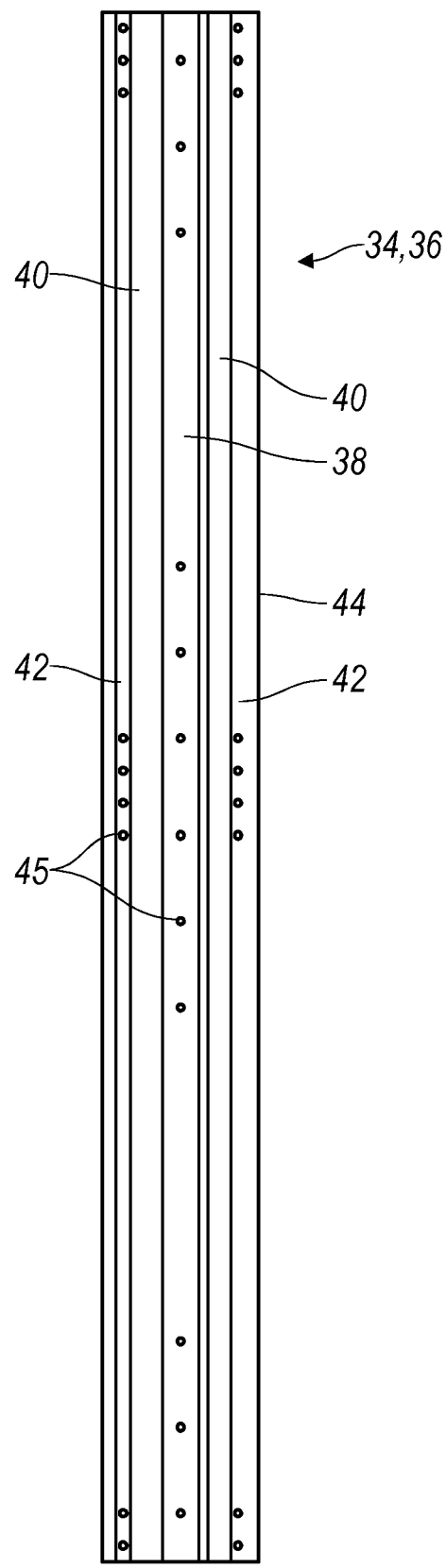
FIG. 5 is an elevation view of a vertical support stiffener.

FIG. 4a is a cross-sectional view of a support column 22 taken along the line 4a-4a of FIGS. 2 and 3. FIG. 4b is a cross-sectional view of a support column 22 taken along the line 4b-4b of FIG. 2. FIG. 5 is an elevation view of one of the many separate vertical support stiffener components, or column sections, that make up the support columns 22 of the present disclosure. Each support column 22 is typically provided with a plurality of inner column sections 34, adjacent to the bin structure 20, and a plurality of outer column sections 36. The inner column sections 34 and the outer column sections 36 may be identical in size in shape. The inner column sections 34 may be coupled to a body sheet 26 of the bin wall. It is envisioned that the support columns 22 of the present disclosure do not require additional cross-braces disposed between them for added support. By using integral support columns of the present disclosure and attaching the inner column sections 34 to the wall segments 26, the wall segments 26 provide any necessary additional reinforcement that would otherwise be provided from cross-bracing.

As is known in the art, many bin structures include one or more spaced apart vertical support members, or stiffeners, disposed around the bin structure to support the bin walls. These vertical support members, or stiffeners are typically formed from a plurality of vertical support stiffener components. In various embodiments, these standard vertical support members may serve as the inner column sections 34 of the integral support columns 22. In other words, two of the plurality of standard vertical stiffeners that are spaced around a typical bin structure are one and the same as the inner column sections 34 of the integral support columns 22.

The outer column sections 36 are coupled to the inner column sections 34 to form an integral, closed shape support column 22. Such a "closed shape" will vary in design based on the structure of the inner and outer column sections 34, 36 and generally defines a hollow column. The inner and outer column sections 34, 36 may be substantially similar to one another, if not having the same shape and dimensions. In various aspects, the inner column sections 34 and the outer column sections 36 each have the same respective gauge thickness. In other aspects, the inner column sections 34 may have a variable gauge thickness, for example the gauge thickness of an uppermost inner column section may be less than the gauge thickness of the lowermost inner column section. The column sections 34, 36 are typically made from galvanized steel and are formed having a substantially hat shaped cross section to include a vertical back portion 38 and opposing angled webs 40 having extending side flanges 42. The side flanges 42 may additionally have a curved extending edge 44 for further strength, rigidity, and support. As shown, at least a portion of the side flange 42 is parallel to the vertical back portion 38. The column sections 34, 36 are provided with various bolt holes 45, disposed for example in the middle and at the ends of the column sections 34, 36, as well as in the vertical back portions 38 and side flanges 42. When assembled, certain of the extending side flanges 42 of the inner column sections 34 are mechanically fastened to the corresponding extending side flanges 42 of the outer column sections 36. The specific details of the mechanically fastening methods may vary as necessary. Standard bolts 46, nuts 48, and washers 50 are shown.

Figure 7:
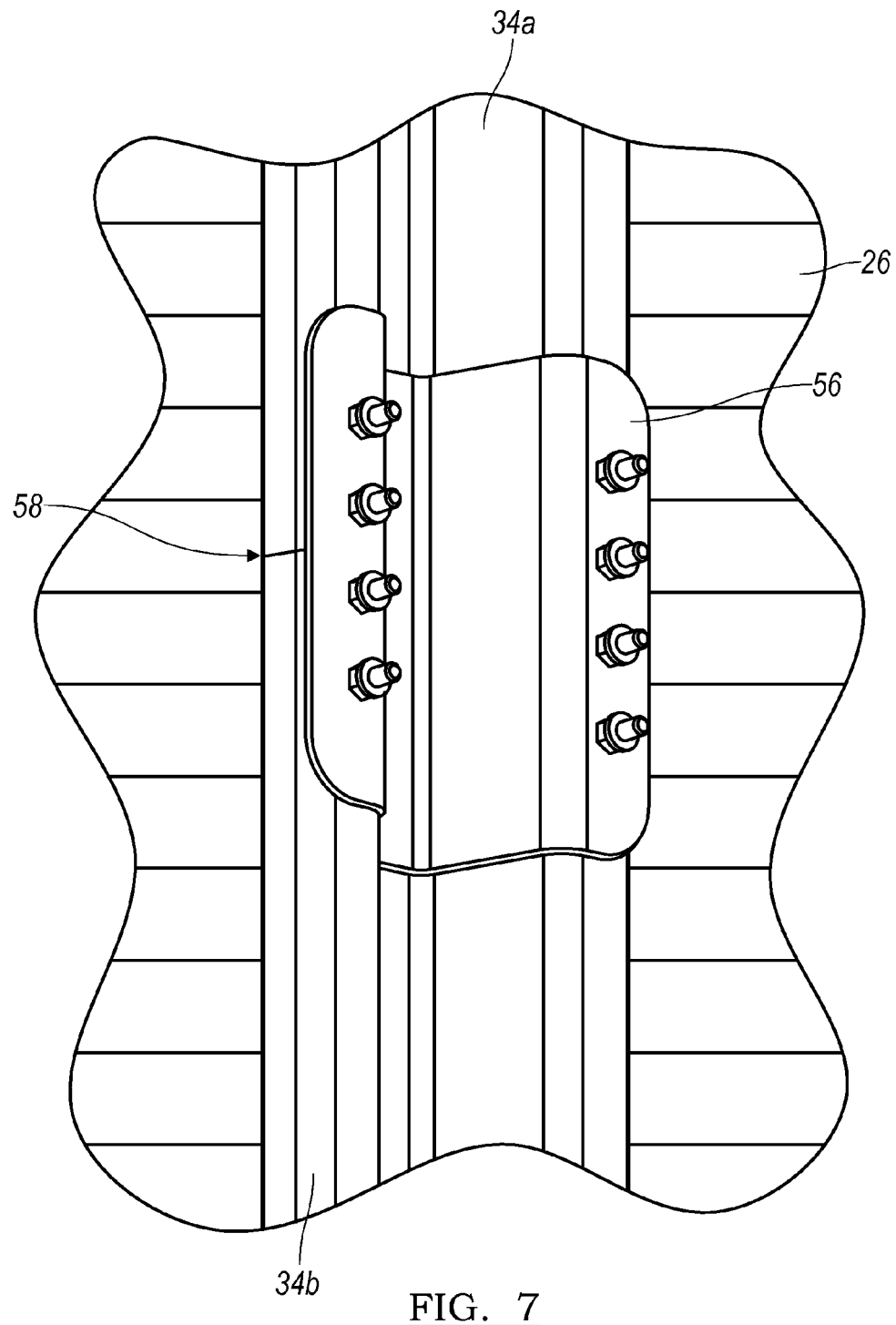
FIGS. 7-10 illustrate various embodiments of the vertical connecting splices.
Figure 8:
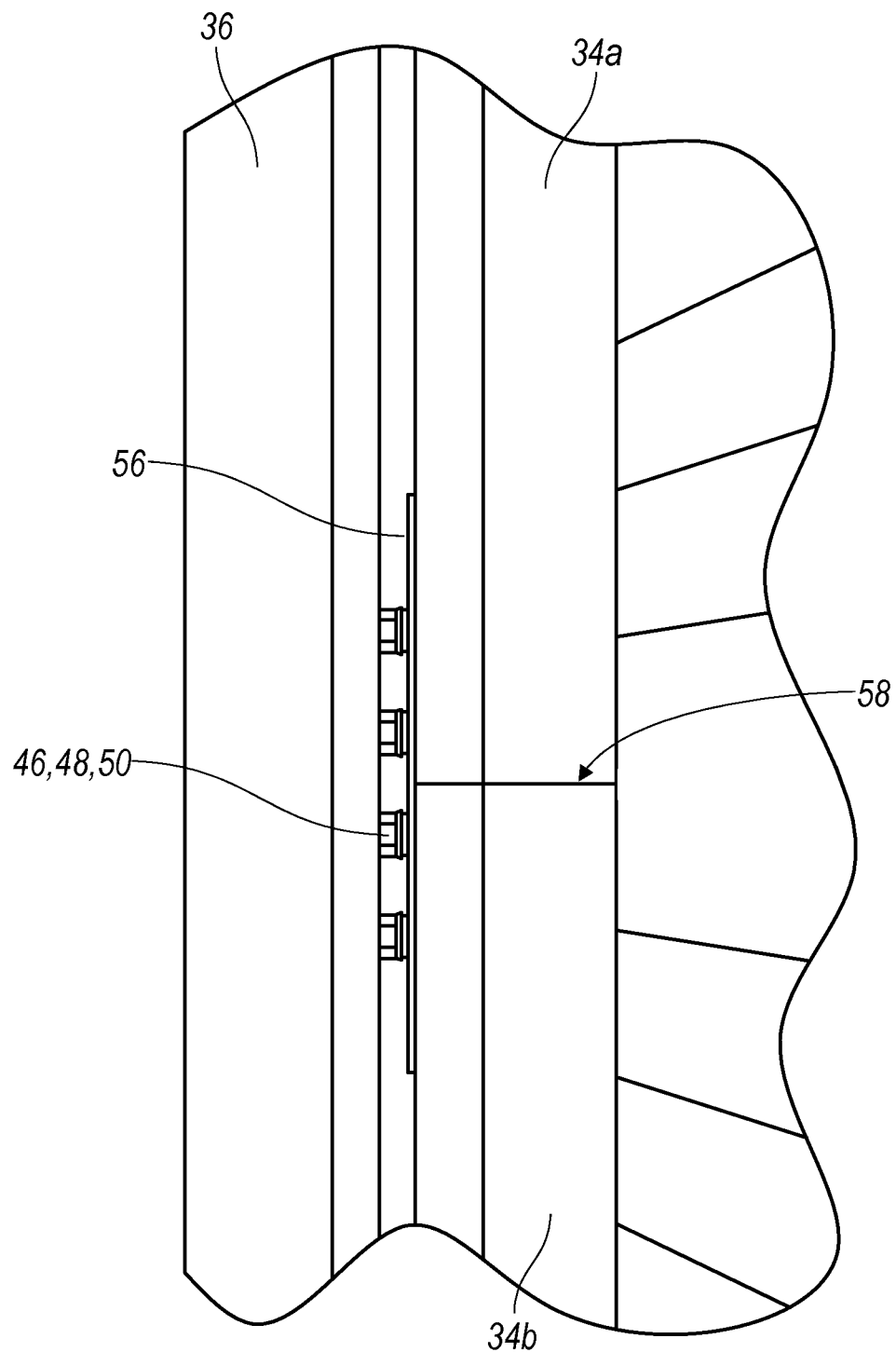

As illustrated in FIGS. 7 through 10, various embodiments of present disclosure provide for the use of vertical connecting splices to join adjacent inner and outer column sections to one another, respectively. Accordingly, the support columns 22 have two types of alternating joints, namely inner joints and outer joints. As shown in FIGS. 7 and 8, two adjacent inner column sections 34a, 34b are coupled to one another with an inner vertical splice 56 forming a reinforced inner joint 58. Here, the mechanical fasteners that are used to join the adjacent inner column sections 34a, 34b are also used to join a center region (in the vertical dimension) of the respective outer column section 36. As shown, the mechanical fasteners secure the inner column sections to the inner vertical splice 56, which in turn is also secured to the outer column section 36. Accordingly, three components are attached to one another forming a very strong connection, and minimizing the need for additional fastening components. FIG. 4b illustrates a cross sectional view of the support column near this inner joint.

Figure 9:
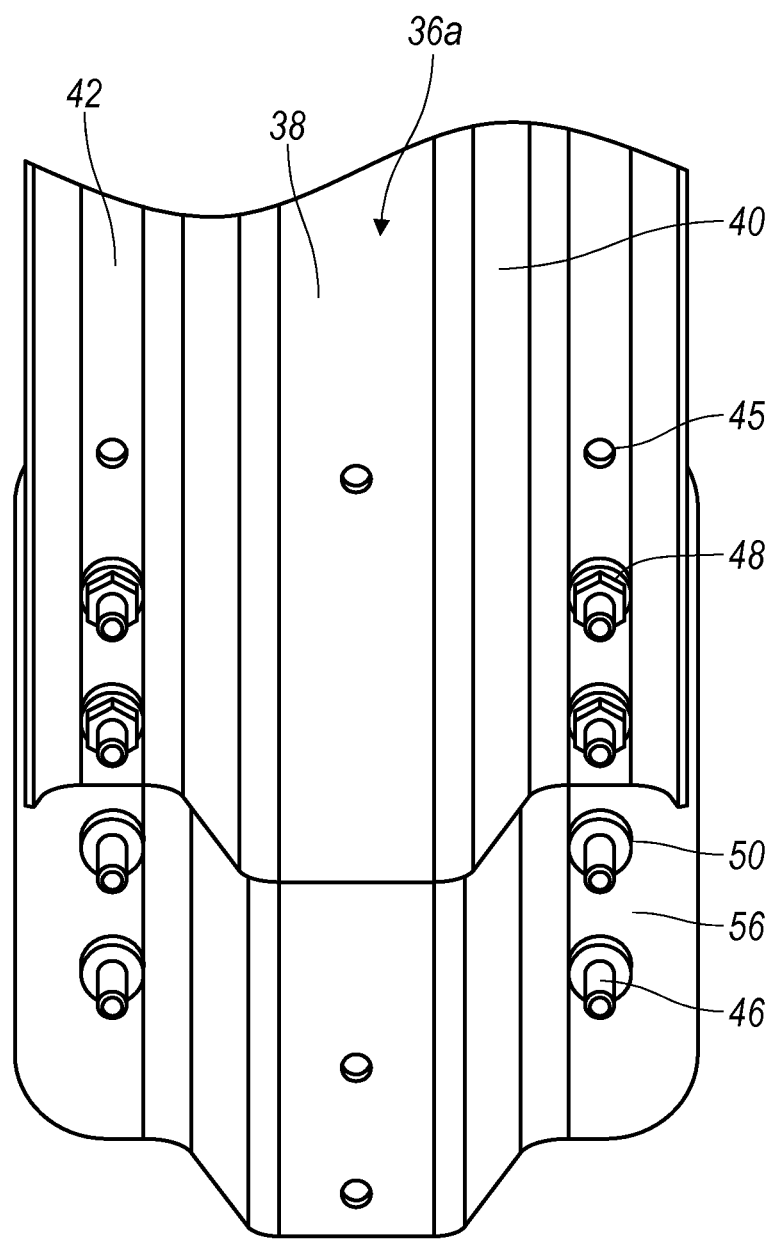
Figure 10:
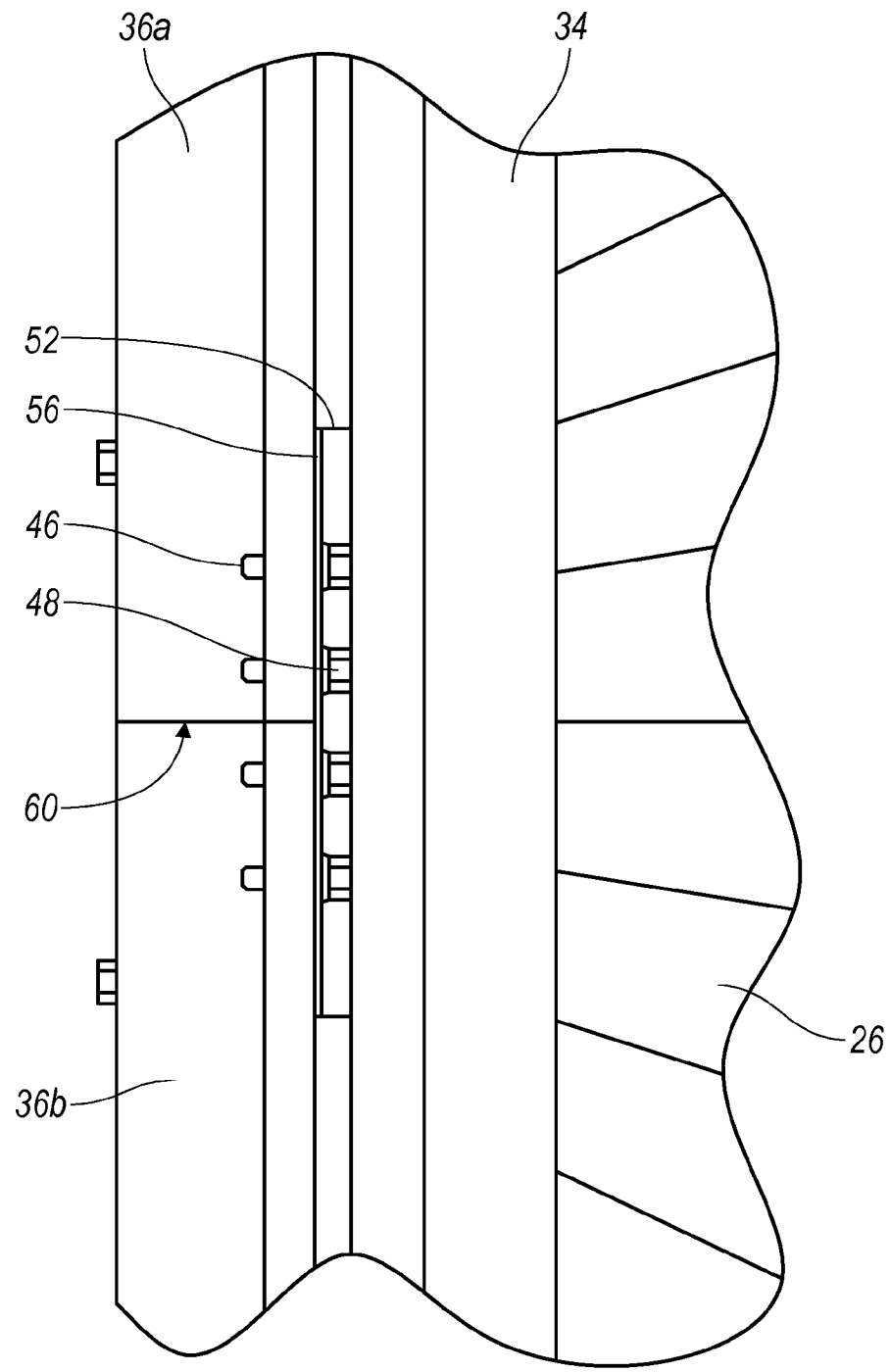

As illustrated in FIGS. 9 and 10, two adjacent outer column sections 36a, 36b are coupled to one another with an outer vertical splice 56 forming a reinforced outer joint 60. Generally, the inner and outer vertical splices 56 are all identical in shape and size and when the integral support columns 22 are fully assembled, the splices are disposed between the inner and outer column sections 34, 36. The vertical splices further have a cross-sectional shape substantially the same as the respective inner column sections 34 and outer column sections 36. As shown, because the mechanical fasteners used to join adjacent outer column sections 36a, 36b are not additionally used to join the center region of the respective inner column section 34 at the outer joint 60 area, one or more C-shaped support brackets 52 are disposed within the support column 22 near the reinforced outer joints 60 to connect the outer column section 34 to the respective inner column section 36 as shown in FIG. 4a. The C-shaped support brackets 52 are configured to secure the vertical back portion 38 of the inner column sections 34 to the vertical back portion 38 of the corresponding outer column sections 36. In certain embodiments, a plurality of substantially J-shaped clip nuts 54 may be provided to mechanically fasten the C-shaped support brackets 52 in areas within the support column 22 that may otherwise be inaccessible.

Figure 6:
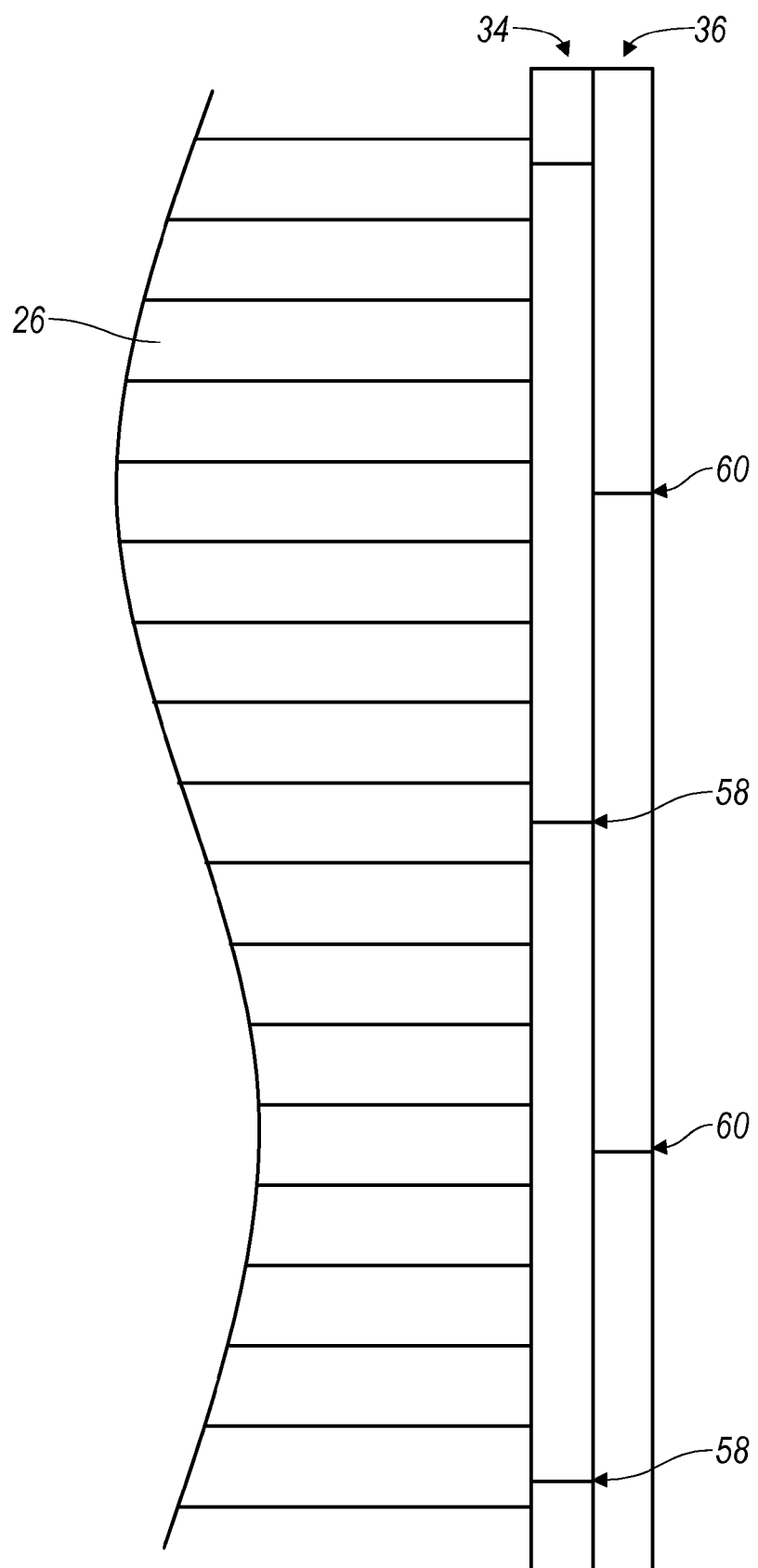
FIG. 6 illustrates the staggered alignment of adjacent inner and outer column sections according to one aspect of the present disclosure.

With specific reference to FIG. 6, the inner joints 58 are spaced apart, or staggered a distance in the vertical direction from the outer joints 60. In certain embodiments, the inner joints 58 and outer joints 60 are spaced equidistant from one another. This staggered relationship assists in eliminating or minimizing any strength discontinuity and thus allows the formation of a more continuous strength support column 22 and provides the requisite strength to support the bin when empty. As previously discussed, it is envisioned that the inner and outer column sections 34, 36 may be identical in size and shape for ease of construction. It should be understood, however, that providing a staggered alignment relationship of the joints 58, 60 between the respective inner and outer column sections 34, 36 will require at least two column sections that have a different length; for example, at the top and bottom region of the integral support column 22, as best shown in FIG. 6.

Figure 11:
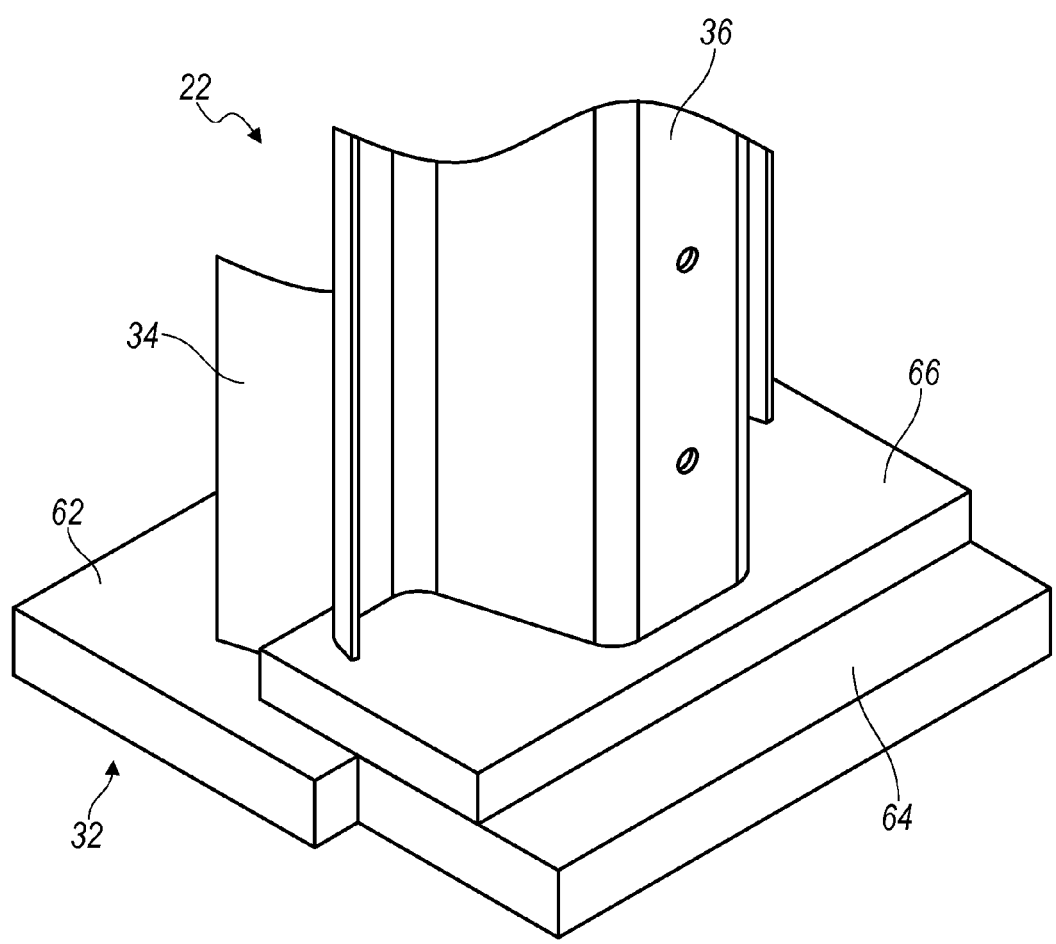
FIG. 11 illustrates a support column of the present disclosure at the foundation of the bin structure.

FIG. 11 illustrates a support column 22 of the present disclosure at the foundation area 32 of the bin structure 20. The bottom of the support columns 22 may be provided to accommodate varying stiffener base plates 62, 64. Accordingly, base plates may be shimmed based upon the specific bin bottom stiffener plate 62, 64 to allow for the correct load transfer. As shown, for example, if base plate 62 is at the same height as plate 66, plates 64 and 66 are interchangeable and plate 66 may lap over both bottom plates. The base plates 62, 64, 66 may be tack welded or otherwise welded to one another.

Figure 12:
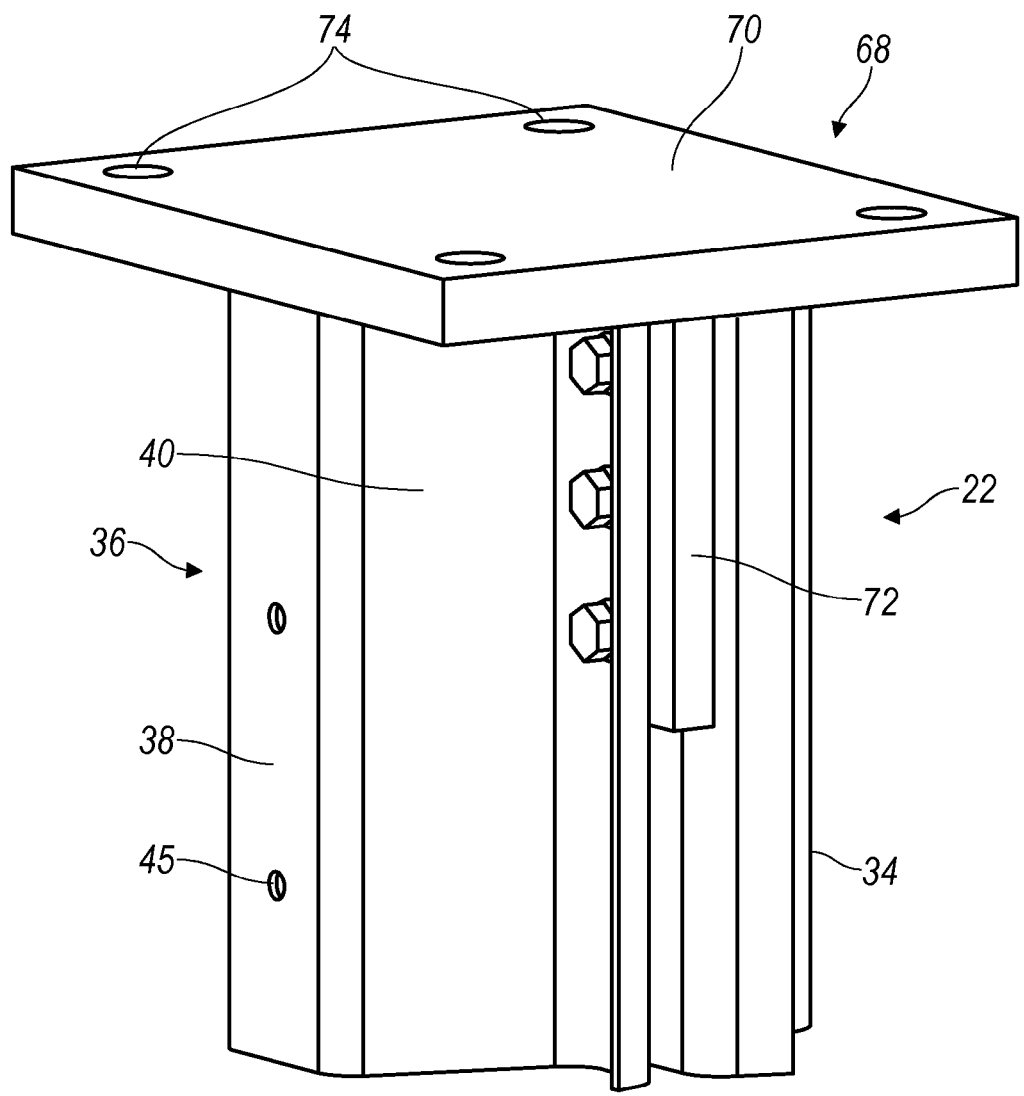
FIG. 12 illustrates a top section of a support column including a T-shaped connecting plate.

FIG. 12 shows a top section of the support column 22 and illustrates a T-shaped connecting plate 68. As shown, the T-plate includes a base portion 70 and a connecting portion 72 that is configured for being bolted or otherwise mechanically fastened between the inner column section 34 and the outer column section 36.

Figure 13:
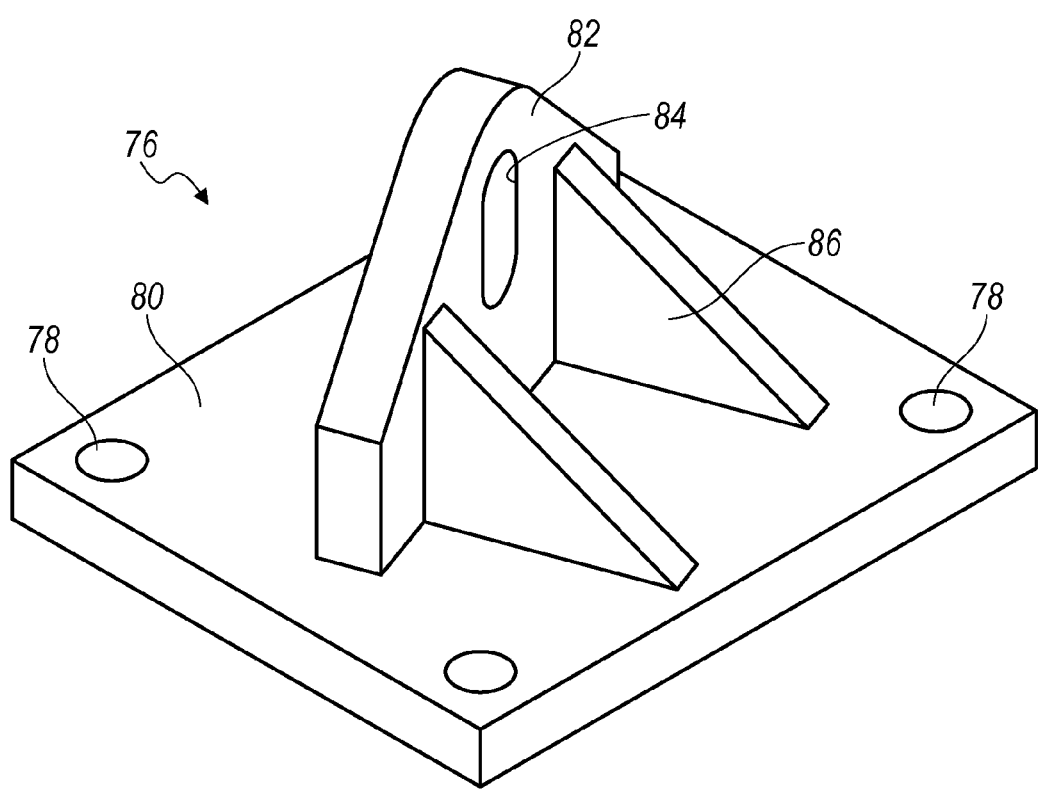
FIG. 13 is a perspective view of an anchor bracket according to the present disclosure.

FIG. 13 illustrates a perspective view of an anchor bracket 76 according to various aspects of the present disclosure. The anchor bracket 76 may be fastened to the T-shaped plate 68. Cooperating apertures 74, 78 are provided on the T-shaped plate 68 and the anchor bracket 76 to allow for standard mechanical fasteners to connect the two components. In various aspects, the anchor bracket 76 is configured to attach to and support a catwalk structure 24 that is disposed substantially above the bin structure 22. In use, the anchor bracket 76 may be configured to allow limited vertical movement of the catwalk structure 24 in relation to the support column 22 or support structure. For example, the bolt hole 84 can be provided as a vertically oriented slot. This can allow for example, the reduction in the moment transferred to the support columns 22 as a result of lateral wind load upon a catwalk or other supported structure 24, since limited rotational movement of the supported structure 24 is permitted.

The anchor bracket 76 may include a base portion 80 and an upstanding connection portion 82 fixed to the base portion. The upstanding connection portion 82 defines an extending slot aperture 84 that is configured to allow a limited pivotal or rotational movement of the catwalk tower. The anchor bracket 76 may further include at least one support member 86 welded thereto or configured to secure the upstanding portion 82 to the base 80. As shown, the slot aperture 84 extends a distance perpendicular to the base 80 and, when secured to a catwalk structure 24, allows limited vertical movement of one side of the catwalk structure 24 in relation to the support structure 22, which preferably remains stationary and fixed. In other embodiments (not shown), the slot aperture 84 may extend in a slightly angled direction to facilitate the pivotal or rotational movement of the catwalk tower.

Figure 14:
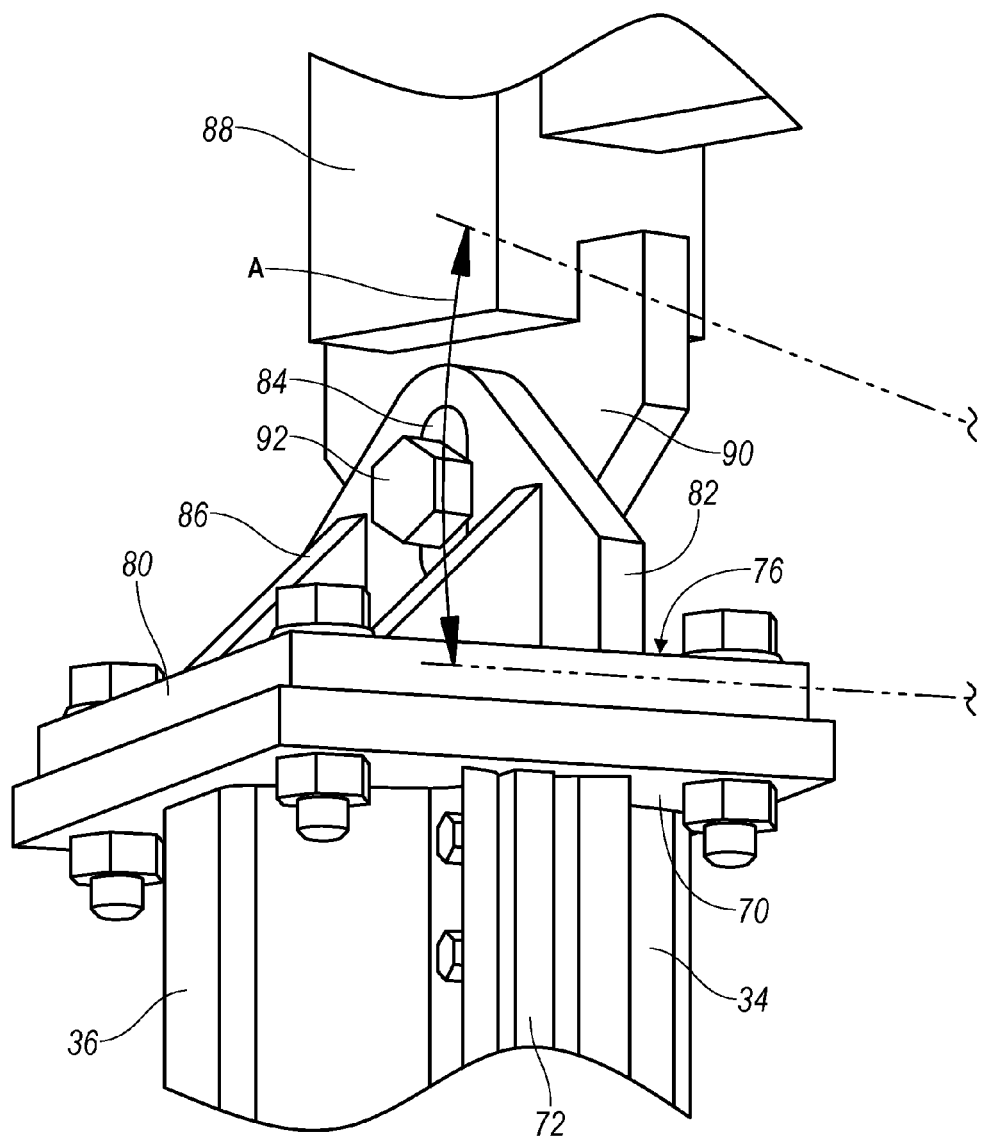
FIG. 14 is a magnified perspective view of the anchoring support system as shown and referenced by circle 14 in FIG. 1.

FIG. 14 is a magnified and detailed view of the anchoring support system as shown in FIG. 1. As shown, a leg 88 of the catwalk support structure, or other auxiliary above-bin structure, is provided with a cooperating extending angle bracket portion 90 configured to mate with the upstanding portion 82 of the anchor 76 and is secured thereto using an appropriate high strength fastener 92. Not only does this design allow for the limited vertical movement of the catwalk structure with respect to the anchor bracket 76 and support column 22 because of the presence of the extended slot aperture 84, it additionally allows the catwalk structure to pivot, tilt, or slightly rotate, in a limited manner resulting from the limited movement in the direction up and down to the upstanding portion 82, as indicated by directional arrow A. This provides still further relief of wind loads as discussed above and minimizes stress at the interface between the bin structure and catwalk structures.

Figure 15:
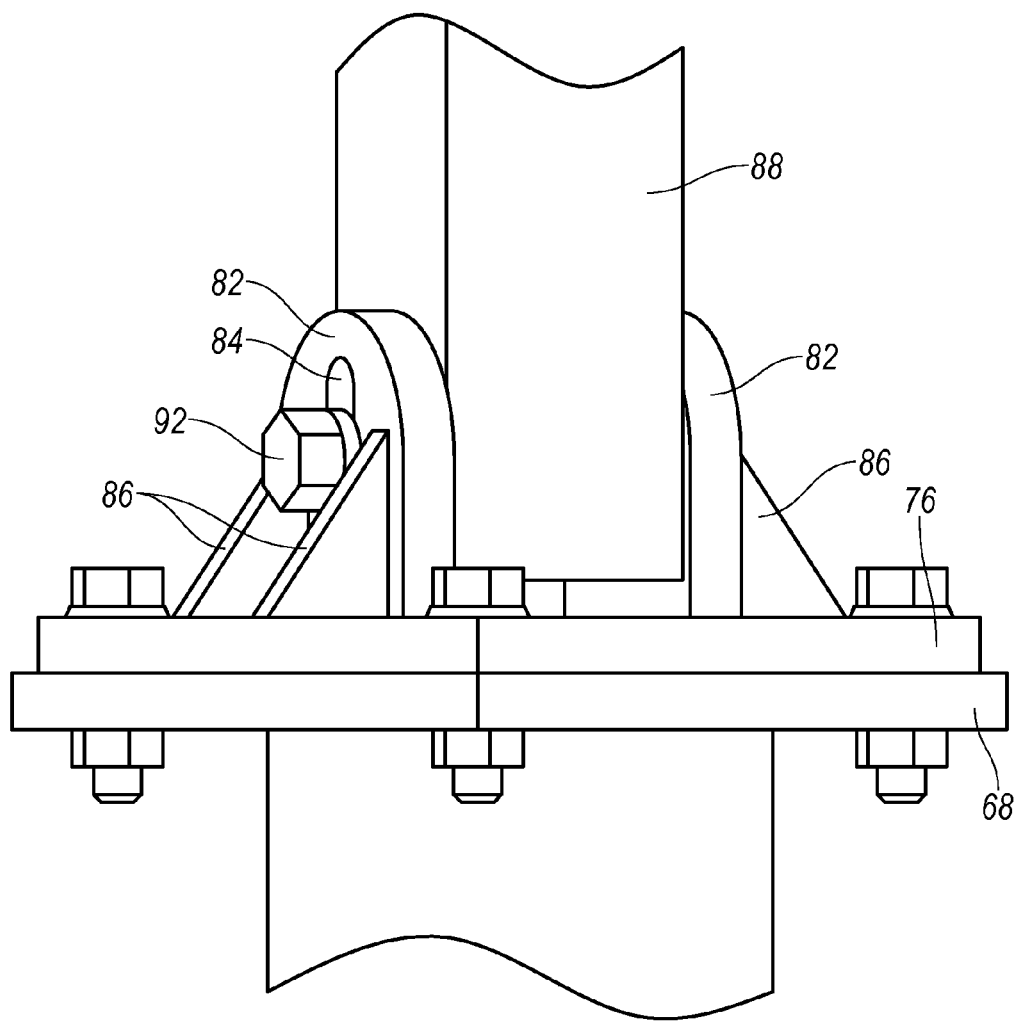
FIG. 15 is a perspective view of another anchor bracket according to the present disclosure.
Figure 16:
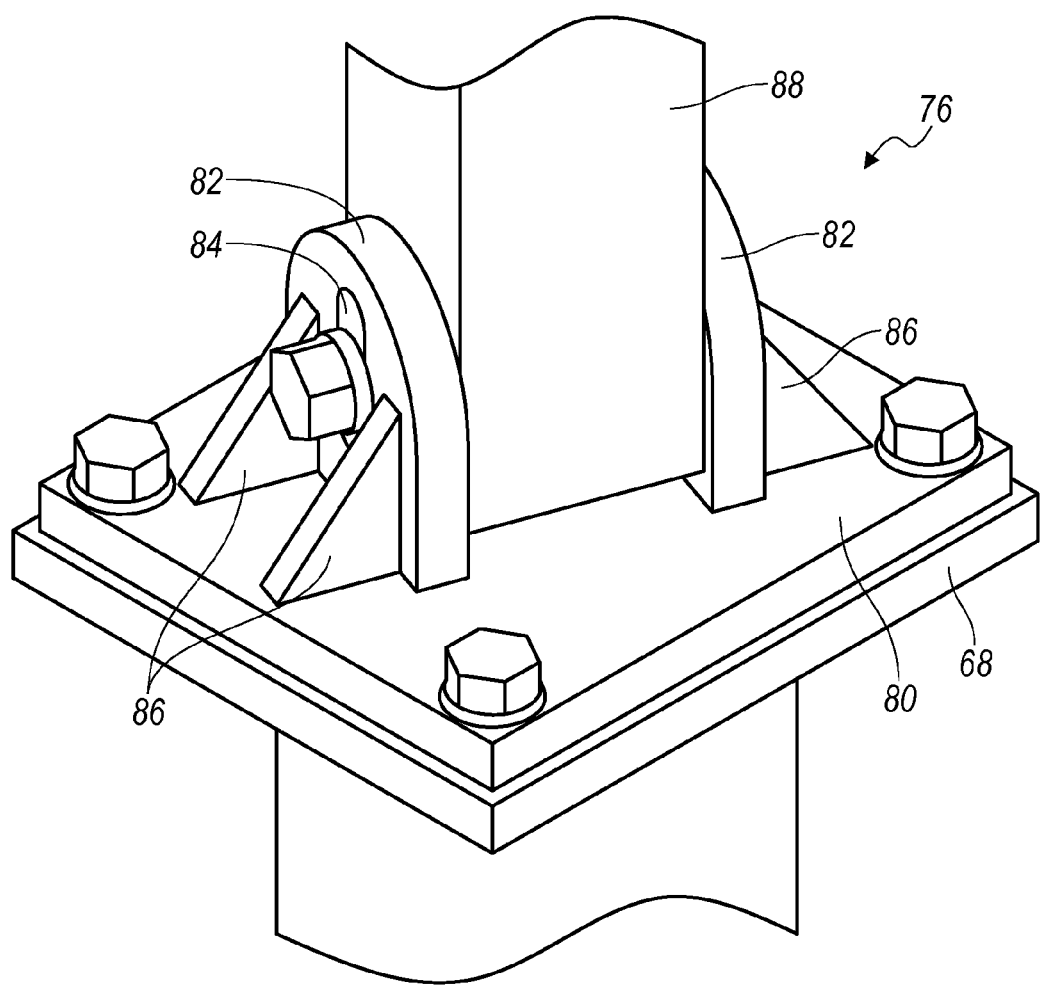
FIG. 16 is a magnified, alternate perspective view of FIG. 15.

FIGS. 15 and 16 illustrate a perspective view of another anchor bracket 76 according to the present disclosure. As shown, this embodiment includes two upstanding portions 82 opposite one another. The leg 88 of the catwalk support is provided between the two upstanding portions 82. The fastener 92 is disposed between both upstanding portions 82, in addition to the leg 88. Each upstanding portion 82 has its own extending slot aperture 84 and support members 86 configured to secure the upstanding portions 82 to the base 80.

Based on the above structural features, the present disclosure also provides various methods for strengthening the structural support of a bin structure 20. In various aspects, the method includes aligning a plurality of supplemental vertical support stiffeners 36 with a plurality of standard vertical stiffeners 34 of a bin structure 20. In certain embodiments, the standard vertical stiffeners 34 may be part of a pre-existing bin structure 20. The supplemental vertical support stiffeners 36 are then mechanically fastened the to the standard vertical stiffeners 34, forming a closed shape support column 20 configured for transferring vertical loads from an upper portion of the bin structure to a foundation 32 of the bin structure. In certain embodiments, the method includes attaching a plurality of vertical splice sections 56 to adjacent standard vertical support stiffeners 34 to form a plurality of standard reinforced joints 58, and attaching a plurality of vertical splice sections 56 to adjacent supplemental vertical support stiffeners 36 to form a plurality of supplemental reinforced joints 60. Aligning the plurality of supplemental vertical support stiffeners 36 with the plurality of standard vertical stiffeners 34 may include staggering the standard reinforced joints 58 from the supplemental reinforced joints 60 in a vertical direction, as discussed above.

In order to provide increased support, the methods may include providing a plurality of substantially C-shaped support brackets 52 disposed within the support columns 22. For example, the C-shaped brackets 52 may be coupled between the standard vertical stiffeners 34 and the supplemental vertical support stiffeners 36. The methods may also include attaching anchor brackets 76 to a top portion of the support columns 22. The anchor brackets 76 may be configured for supporting a catwalk structure 24 above the bin structure 20, and may additionally allow limited movement and/or pivoting motion of the catwalk structure 24 in relation to the bin structure 20 and support columns 22.

Still further, the present disclosure provides methods of relieving moment stresses, including horizontal and vertical loads, at the interface between a bin structure 20 and a catwalk structure 24 disposed above the bin structure 20. In various embodiments, the method includes forming a pair of closed shape support columns 22 configured for transferring vertical loads from an upper portion of the bin structure 20 to a foundation 32 of the bin structure. Anchor brackets 76 may be attached to a top end of the support columns 22, wherein a catwalk structure 24 is fastened to the anchor brackets 76. The method includes providing an anchor bracket 76 that allows limited movement of the catwalk structure 24 in relation to the support columns 22. Such limited movement may include limited movement in the vertical direction, which allows limited tilting or pivoting movement of the catwalk structure 24 in relation to the support columns 22.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A grain bin and auxiliary structure combination, comprising:
   a substantially circular bin structure including a roof of the grain bin, a foundation, and a plurality of wall panels forming a substantially circular exterior wall extending between the foundation and an eave of the roof;
   at least two parallel and spaced apart support columns coupled to the bin structure, each of the support columns having a plurality of inner column sections and a plurality of outer column sections, the inner column sections being coupled to an exterior of adjacent wall panels of the wall panels of the bin structure, the outer column sections being coupled to the inner column sections and forming a closed shape support column; and an auxiliary structure extending above the roof at the eave of the bin structure and coupled to the support columns adjacent the eave;

wherein the support columns extend along the exterior of the exterior wall to transfer vertical loads from the auxiliary structure to the foundation of the bin structure.

2. The combination of claim 1, further comprising a connecting plate coupled to a top portion of at least one support column to support the auxiliary structure extending above the roof at the eave.

3. The combination of claim 2, further comprising an anchor bracket coupled to the connecting plate adjacent the eave, the anchor bracket being fastened to the auxiliary structure to provide a limited movement coupling between the auxiliary structure and the support column.

4. The combination of claim 3, wherein the anchor bracket defines an extended slot of the limited movement coupling that allows vertical and/or pivotal movement of the auxiliary structure extending above the roof at the eave in relation to the support column.

5. The combination of claim 2, wherein the connecting plate comprises a T-shaped member including a base portion to support the auxiliary structure and a connection portion perpendicular to the base portion and mechanically fastened between the respective inner column section and the outer column section of the support column.

6. The combination of claim 1, wherein the inner column sections and the outer column sections each comprise a substantially hat shaped cross section, including a vertical back portion with opposing angled webs having extending side flanges, wherein at least a portion of each extending side flange is parallel to the vertical back portion.

7. The combination of claim 1, further comprising a plurality of inner vertical splices and a plurality of outer vertical splices, wherein adjacent inner column sections are coupled to one another via an inner vertical splice, and wherein adjacent outer column sections are coupled to one another via an outer vertical splice.

8. A grain bin and auxiliary support structure, comprising:
a substantially circular bin structure including a roof of the grain bin, a foundation, and a plurality of wall panels forming a substantially circular exterior wall extending between the foundation and an eave of the roof;
a load bearing support structure coupled to an exterior of the exterior wall of the bin structure;
an auxiliary structure extending above the roof at the eave; and
at least one anchor bracket adjacent the eave providing a limited movement coupling between the support structure and the auxiliary structure, and the limited movement coupling comprising a cooperating shaft extending through an enlarged aperture to permit limited movement of the auxiliary structure extending above the roof at the eave in relation to the support structure.

9. The combination of claim 8, wherein the anchor bracket comprises a base and an upstanding connection portion fixed to the base, the upstanding connection portion including the enlarged aperture of the limited movement coupling in the form of an extending slot aperture that couples to the auxiliary structure to allow for the limited movement of the auxiliary structure extending above the roof at the eave.

10. The combination of claim 9, wherein the slot aperture extends a distance substantially perpendicular to the base and allows limited vertical movement of the auxiliary structure in relation to the support structure.

11. The combination of claim 9, wherein the slot aperture extends a distance substantially parallel to the base and allows limited pivoting movement of the auxiliary structure in relation to the support structure.

12. The combination of claim 9, wherein the upstanding connection portion is configured to mate with a corresponding angle bracket portion of the auxiliary structure to allow movement of the auxiliary structure in relation to the support structure.

13. The combination of claim 9, wherein the anchor bracket further comprises at least one support member securing the upstanding portion to the base.

14. The combination of claim 8, wherein the load bearing support structure comprises at least two parallel and spaced apart support columns, each of the support columns having a plurality of inner column sections and a plurality of outer column sections, the inner column sections being coupled to an exterior of adjacent wall panels of the bin structure, the outer column sections being coupled to the inner column sections and forming a closed shape support column that transfers vertical loads from the auxiliary structure to the foundation of the bin structure.

15. The combination of claim 8, wherein the auxiliary structure comprises a catwalk tower.

16. A grain bin and auxiliary structure combination, comprising:
a substantially circular exterior wall extending between a foundation and an eave of a roof of the bin, the substantially circular exterior wall defined by a plurality of outer panels and a plurality of standard vertical stiffeners, each of the standard vertical stiffeners comprising a base and two flanges with each of the flanges being connected to the base by an outwardly angled member, and the base and each of the flanges including portions that are parallel to each other, the base of each of the standard vertical stiffeners being coupled to an exterior of the outer panels;
a plurality of supplemental vertical stiffeners, each of the supplemental vertical stiffeners comprising a base and two flanges with each of the flanges being connected to the base by an outwardly angled member, and the base and each of the flanges including portions that are parallel to each other, each of the two flanges of each of the supplemental vertical stiffeners being coupled to one of the two flanges of a corresponding one of the standard vertical stiffeners to form a hollow-shaped support column having a substantially symmetrical shape relative to a plane passing between each of the two flanges of each of the supplemental vertical stiffeners and each of the two flanges of the corresponding one of the standard vertical stiffeners;
an anchor bracket coupled to a top end of the support column adjacent the eave of the roof; and
an auxiliary structure coupled to the anchor bracket and extending upwardly above the roof at the eave from the anchor bracket;
wherein the support columns extend along the exterior of the exterior wall to transfer vertical loads from the auxiliary structure extending above the roof at the eave to the foundation.

17. The combination of claim 16, wherein a coupling between the auxiliary structure and the anchor bracket is configured to permit vertical and/or pivotal movement of the auxiliary structure in relation to the support column.

18. The combination of claim 17, wherein each support column further comprises inner vertical splice sections coupled to adjacent inner vertical support stiffeners forming reinforced inner joints, and outer vertical splice sections coupled to adjacent outer vertical support stiffeners forming reinforced outer joints.

19. The combination of claim 16, wherein the anchor bracket comprises a base and an upstanding connection portion fixed to the base, the upstanding connection portion defining a vertically extending slot aperture configured to allow the limited movement of the auxiliary structure.

* * * * *

UNITED STATES PATENT AND TRADEMARK OFFICE
CERTIFICATE OF CORRECTION

PATENT NO. : 8,511,010 B2  
APPLICATION NO. : 13/569889  
DATED : August 20, 2013  
INVENTOR(S) : Rodney B. Grossman et al.

Page 1 of 1

It is certified that error appears in the above-identified patent and that said Letters Patent is hereby corrected as shown below:

In the Specification

| Issued Patent Column | Line | Description of Error |
|---|---|---|
| Column 5, | Line 11 | Delete "in" and insert --and-- (second occurrence), therefor. |
| Column 7, | Line 12 | Delete "22" and insert --20--, therefor. |
| Column 8, | Line 3 | After "fastened", delete "the". |

Signed and Sealed this  
Nineteenth Day of November, 2013

Teresa Stanek Rea  
*Deputy Director of the United States Patent and Trademark Office*